E. F. PARKER.
LID CLOSER.
APPLICATION FILED APR. 4, 1914.
1,179,028.
Patented Apr. 11, 1916.
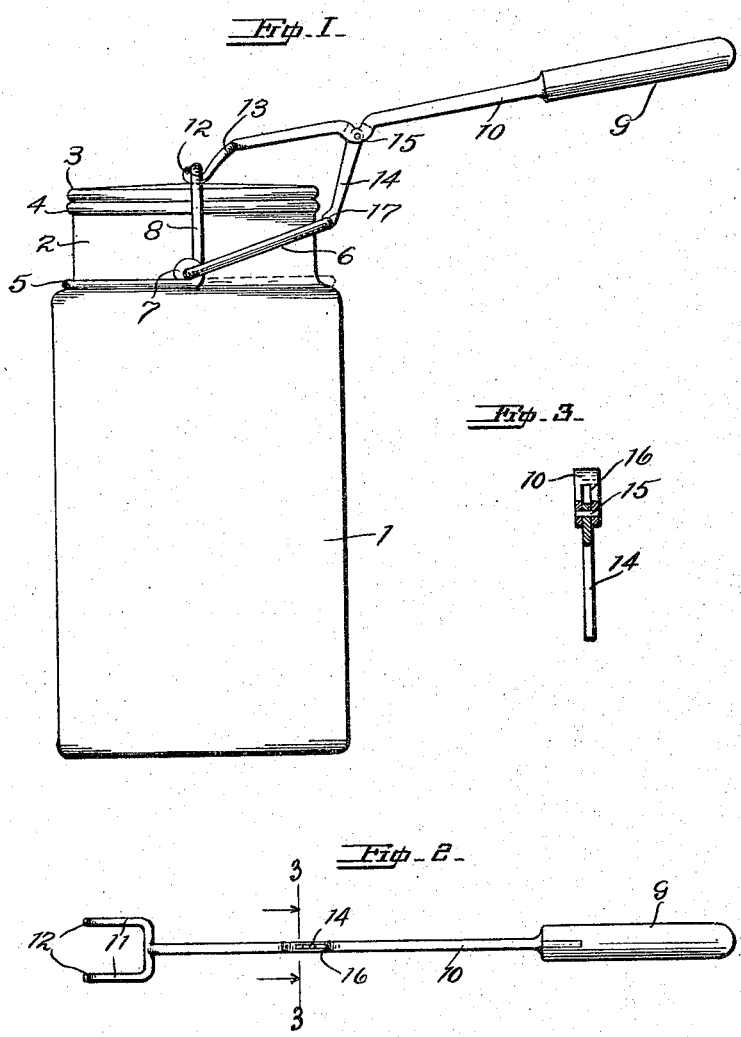

UNITED STATES PATENT OFFICE.

ERVIN F. PARKER, OF PHILLIPS, MAINE.

LID-CLOSER.

1,179,028. Specification of Letters Patent. Patented Apr. 11, 1916.

Application filed April 4, 1914. Serial No. 829,663.

*To all whom it may concern:*

Be it known that I, ERVIN F. PARKER, a citizen of the United States, residing at Phillips, in the county of Franklin and State of Maine, have invented certain new and useful Improvements in Lid-Closers, of which the following is a specification.

In cooking fruit in jars in which the fruit is to be canned and preserved for future use, the lid or cover is not closed tightly during the cooking operation because it is desirable, and necessary, to permit escape of air. When the contents of the jar has been cooked to the desired extent, it is then necessary to fasten the lid or cover of the jar before the same has cooled and this fastening operation is generally carried out immediately after the contents have been cooked. At this stage, the jar is at such a high temperature, either when partly submerged or when not submerged, that it is very difficult to close the fastening means for the cover.

It is the object of this invention to provide mechanism for fastening the closure means for the cover in such a manner as not to subject the user to injury such as burns, and to greatly facilitate moving the cover-closing means into a final position.

Other features and objects of the invention will be more fully described in connection with the accompanying drawing and will be more particularly pointed out and ascertained in and by the appended claims.

In the drawing, Figure 1 illustrates one form of my invention applied to move the lid closing means into a final or closing position. Fig. 2 is a bottom plan view of the device of my invention. Fig. 3 is a sectional view on line 3—3 of Fig. 2.

Like characters of reference designate similar parts throughout the different figures of the drawing.

As illustrated, 1 designates a common type of fruit or like jar having a reduced neck 2 on the mouth of which a cover 3 is disposed. Usually, a rubber or like packing ring or washer is interposed between the cover and the bead 4, adjacent the mouth of the jar, so as to form a tight closure.

I have illustrated a typical form of wire-closing device for the lid or cover 3, and the same includes a neck bail 5, which embraces a portion of the neck 2, and to which a fastening bail 6 is pivoted. The neck bail 5 is provided with eyed terminals 7 in which the ends of the fastening bails 6 are mounted to swing. A cover or lid bail 8 is connected in the usual way with the fastening bail 6 so that when the latter is depressed from the full to the dotted-line position as shown in Fig. 1, the lid bail 8 will securely hold the cover 3 upon the jar. It is usual in glass or earthen jars to provide the lid with a central crest or elevation for engagement with the lid or cover bail, and likewise lateral projection. Between the cover bail and the lid, laterally of the central crest, there is usually a free space. The fastening device shown, is of that type which will securely hold the cover in air-tight engagement over the mouth of the jar when the bail 6 is moved downwardly.

Next, referring more specifically to the improvement constituting my invention, 9 designates a hand grip from which a shank 10 extends. The shank 10 is provided with a bifurcated terminal, the terminal ends being indicated at 11, and being preferably hooked shaped, as indicated at 12, so as to grasp the cover bail when inserted therebetween and the cover 3. I also preferably bend the shank at 13 so that the hook terminals 12 will depend downwardly from the longitudinal axis of the shank, as indicated in Fig. 1. Between the ends of the shank, I pivot a strut-closing bar 14, at point 15, and I may slot the shank 10, as indicated at 16, to accommodate said bar 14. The lower end of bar 14 is provided with a concave terminal portion 17 adapted to fit on and slidably engage the closing bail 6.

Fig. 1 shows the lid fastener device with the closing bail 6 in an open position, and with the device of my invention applied thereto. By pressing downwardly on the hand-grip 9, the hook terminals 12 will cause the device to fulcrum at that point and the strut-bar 14 will depress the bail 6 into the dotted-line position. The pivotal mounting 15 permits of movement of the strut bar 14 in accordance with the different positions which the outer bight of the bail 6 takes, and the concave end 17 will slide over the bail 6 as the latter is forced downwardly into a tightening position.

It will therefore be seen that the device of my invention provides means engaging a jar structure and its lid fastening means at different points for moving the fastening means into a closing position.

It is believed that the advantages and utility of my invention will be clearly understood from the foregoing description and while I have herein shown and described one specific form of my invention, I do not wish to be limited thereto except for such limitations as the claims may import.

I claim:—

1. A lid fastener comprising lid engaging means and a lever device for shifting said means into a lid closing position, said lever device being independent of said means, and removable therefrom.

2. A lid fastener comprising means to hold a closure from displacement on a vessel, and a manually operated member engageable with said means to operate the same into locking position on the closure, whereby contact of the hands of the operator with the closure or closure retaining means, is unnecessary.

3. A lid fastener comprising means for holding a lid in a closed position and an independent lever device for engaging the lid and having a movable part engaging said means to move the latter into a lid closing position.

4. A lid fastener comprising bail means including a lid engaging bail and a closing bail for holding the lid closed, and a lever device engaging the lid bail and having a movable part for engagement with the closing bail to move the latter into a closing position, said lever device being independent of said bail means and removable therefrom.

5. A lid fastener comprising bail means including a lid engaging bail and a closing bail for holding the lid closed, and a lever device having a hooked end for fulcrum engagement between the lid bail and the lid, and a pivotally mounted strut rod for engagement with the closing bail to move the latter into a closing position.

6. A lid fastener comprising a bail device for holding the lid in a closed position and independent means engaging different portions of the bail device for moving the same into a closing position, substantially as described.

7. A lid fastener comprising bail means including a lid engaging bail and a closing bail for holding the lid engaging bail in an operative position and an independent lever having a bifurcated hooked end for interposition between the lid bail and the lid, and provided with a pivotally mounted strut bar for engagement with the closing bail, to move the latter into a closing position.

8. In a device of the character described, a lever, including a handle, a shank extending from said handle, said shank being provided with a bifurcated hooked end, and having a portion intermediate its end bent and slotted, and a strut bar pivotally mounted in said slot, as and for the purpose set forth.

In testimony whereof I affix my signature in presence of two witnesses.

ERVIN F. PARKER.

Witnesses:
ABEL E. BUNNELL,
WILBER E. COX.